United States Patent Office 3,725,083
Patented Apr. 3, 1973

3,725,083
PROCESS FOR THE PRODUCTION OF NATURALLY OCCURRING COLORING MATERIAL FROM CITRUS FRUIT AND THE PRODUCT THEREOF
Rodger W. Barron, Lake Alfred, Paul J. Fellers, Winter Haven, and Richard L. Huggart, Lake Wales, Fla., assignors to State of Florida, Department of Citrus
Filed Aug. 5, 1970, Ser. No. 61,385
Int. Cl. A23l 1/26
U.S. Cl. 99—105                                        7 Claims

ABSTRACT OF THE DISCLOSURE

Naturally occurring coloring material is produced from citrus fruit by extracting the juice from the fruit, filtering the juice, centrifuging the filtered juice and separating as solid matter the coloring material which can be added to juices and other beverages to enhance the natural color thereof.

---

Figure 1:
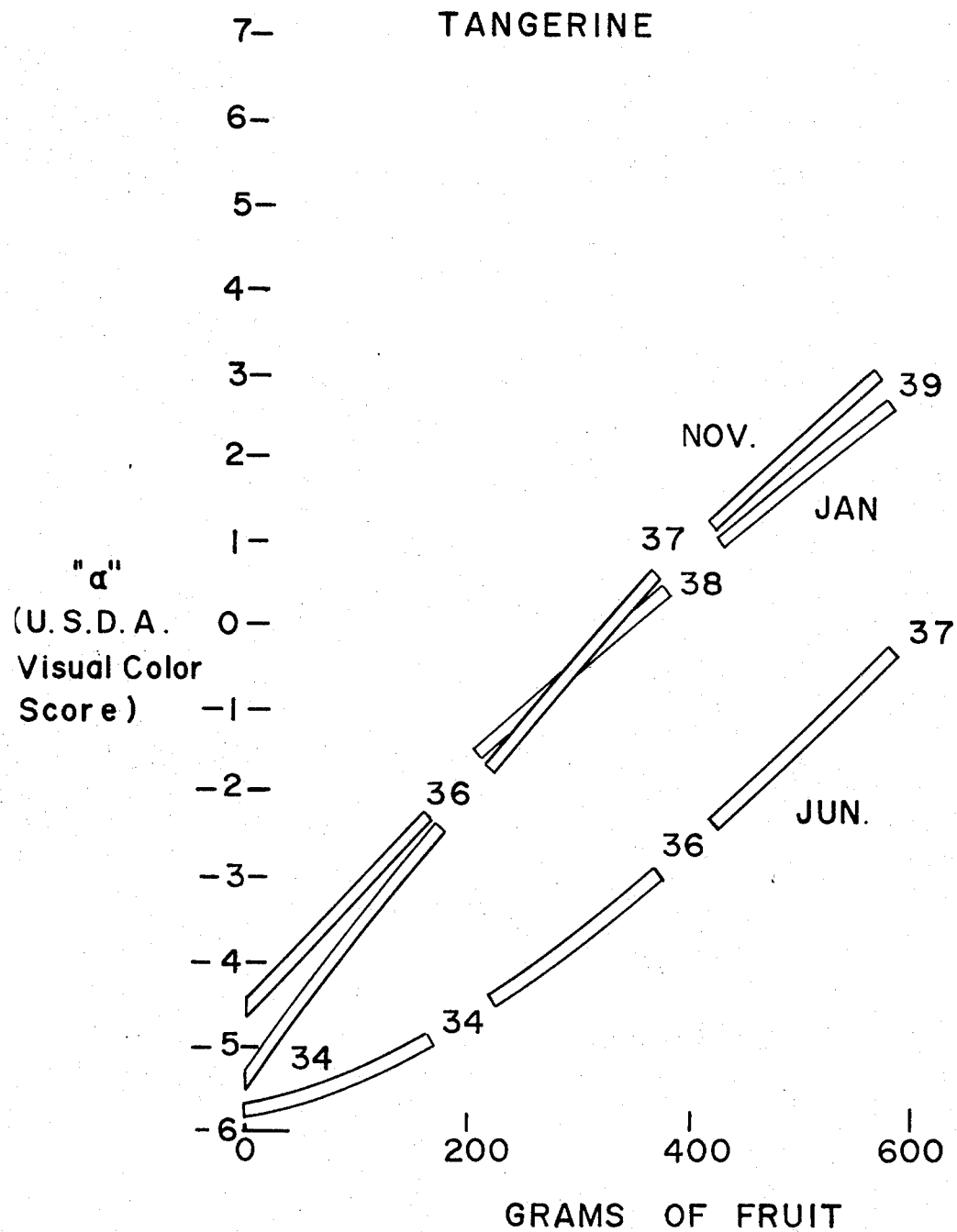

This invention relates to a new process for enhancing the color of citrus and other juices. More particularly, this invention relates to a new process for enhancing the color of juices by the incorporation therein of pigments naturally present in citrus juices. This invention further relates to concentrated color bodies or chromoplasts which are obtained by the process of the instant invention from citrus juices.

Studies have indicated that consumer preference for beverages and in particular reconstituted citrus juice is definitely affected by the color of the juice. Color has in fact been found to be one of the most influential factors affecting the preference of consumers for particular citrus juices. Based on U.S. Department of Agriculture visual scores for color it has, for example, been determined that consumers tested definitely preferred orange juice having a color score of 39 to less colored orange juice having a visual color score of only 36.

One of the problems, however, associated with the processing of citrus juices is that the color of the juice tends to vary considerably depending upon variety, condition of the fruit, and most significantly the month in which that orange crop was harvested. For example, it was determined that for oranges harvested during the months of December through June, 43% had a color score of under 36, 51% had a color score of 37, and only 6% had a color score of 39, which was the value found to produce the highest consumer acceptance.

Accordingly it is an object of the present invention to provide a method and product for enhancing the natural color of juices. It is a further object of the present invention to enhance the color of citrus and other juices by the incorporation therein of color bodies which have been isolated and recovered from the citrus fruit rather than by the use of artificial or non-citrus derived coloring materials.

Now in accordance with the present invention it has been found that the color of juices such as full strength and reconstituted citrus juice concentrates as well as synthetic base drinks can be substantailly enhanced by the incorporation into these beverages of pigment granules which can be isolated from selected highly colored citrus fruit. It is yet a further feature of the present invention that it has been discovered that these naturally occurring pigments or chromoplasts can be sufficiently concentrated and added in sufficient quantity to beverages to produce desirable significant enhancement of coloration in the juice.

According to the present invention, the juice of relatively highly colored citrus fruits, such as for example "Dancy" tangerines or "Murcott" oranges, is extracted and then filtered to remove entrained solid particles such as seeds and pulp to give a juice containing chromoplasts responsible for the color of the juice. This filtered juice is then processed, for example by centrifuging, to remove substantially all of the chromoplasts from the fluid. The "pellet" of solid matter which is thereby obtained consists essentially of the solid pigment particles from the juice and is divided into fairly specific color layers, the bottom most layer obtained in solid being brown in color and the remaining layers red, orange, and in some cases yellow (although the yellow chromoplasts have been found in some instances to remain in the solution). The brown layer is discarded and the remaining colored layers are then suspended in fresh water and rewashed with water and recentrifuged. The pigmented particles or chromoplasts which are finally obtained can then be dried to produce a colored powder which can be added, for example, to citrus juices (either single strength or concentrated) in sufficient quantity to bring that juice up to a desired color level, e.g. having a color score of about 39.

Generally the amount of dried chromoplasts which is added to beverages to enhance the color will vary somewhat depending upon, for example, the color of the beverage to which the chromoplasts are added as well as the intensity and amount of specific colors present in the chromoplasts themselves. It has, however, been found that ordinarily the color of citrus juice, for example, can often be increased by about 2 points in the U.S.D.A. color score by the addition of dried chromoplast material equivalent to the amount of chromoplast material obtained from highly colored citrus juice equal in volume to 50% to 100% of the amount of juice to which the pigment is being added. By the addition of chromoplast obtained from a volume of juice equivalent to 100% to 150% or more of the amount of juice to which the material is being added, the color score can be raised by as much as 5 points, e.g. from 34 to 39.

EXAMPLE

Isolation of chromoplasts

About 150 ml. of juice was extracted from each of two 300 gram samples (whole fresh weight) of "Dancy" tangerine and "Murcott" orange fruits and filtered through coarse mesh cloth. The filtered juice was then centrifuged at 4000× gravity for 10 minutes. With the tangerine juice this force was sufficient to centrifuge all of the chromoplasts out of suspension, giving a clear, opalescent supernatant fluid and a pellet containing the chromoplasts. The supernatant fluid after centrifugation of "Murcott" juice, however, was yellow. The pellets were found in each case to consist of several layers of particulate material of different color. A layer of brown maetrial was found at the bottom of the pellet with the red and orange chromoplasts above that, topped with a layer of yellow chromoplasts in the case of the tangerine juice. The yellow chromoplasts were absent from tangerine juice.

The supernatant fluid was removed by decantation, and the chromoplasts were resuspended in tap water without disturbing the brown material which adhered to the walls of the centrifuge tube. This brown substance was discarded. The chromoplasts were then washed twice by recentrifugation in tap water to remove acids and other juice components. Prior to the final centrifugation, the chromoplasts suspension was distributed equally in 6 centrifuge tubes. Thus, each tube contained the equivalent of 50 grams of whole fruit. Water was decanted from the final pellet and the tube was allowed to drain.

Addition of chromplasts to orange juice

A 6-ounce can of commercial concentrated orange juice was reconstituted with tap water and divided into 4 equal portions. Appropriate amounts of the packed chromoplasts were then resuspended in the juice. A mortar and pestle were used to thoroughly disperse the particles in a small volume of juice before adding them to the remainder. The addition of the chromoplasts in one centrifuge tube to the reconstituted juice from one-fourth of a 6-ounce can of concentrate is equivalent to adding the chromoplast material from about 100 ml. ounces of the juice of 200 grams of whole fresh fruit to 24 ounces of juice reconstituted from one, 6-ounce can of concentrate.

Measurement of color

The reconstituted orange juices with added chromoplasts were analyzed for lightness $R_d$, redness $a$, and yellowness $b$ with a color difference meter. Color scores were then determined relating the $R_d$ and $a$ values to the U.S.D.A. visual scores for orange juice.

The addition of chromoplasts isolated from the highly colored juice of "Dancy" tangerines or "Murcott" oranges to a reconstituted commercial juice having a low color score increased the color meter $a$ value, indicating an increase in the redness of the juice. The treated juice was judged much more appealing in color than the untreated and no change in flavor was detected.

FIG. 1 shows the results that were obtained in three separate experiments with chromoplasts isolated from "Dancy" tangerines. Addition of chromoplasts isolated from juice from the equivalent of 200 grams of whole fruit harvested in November or January, to juice reconstituted from one 6-ounce can of concentrate increased the U.S.D.A. visual color score by 2 points. Chromoplasts isolated from late season (June), cold-damaged fruit were more orange than red, and considerable brown material was found in the juice.

Figure 2:
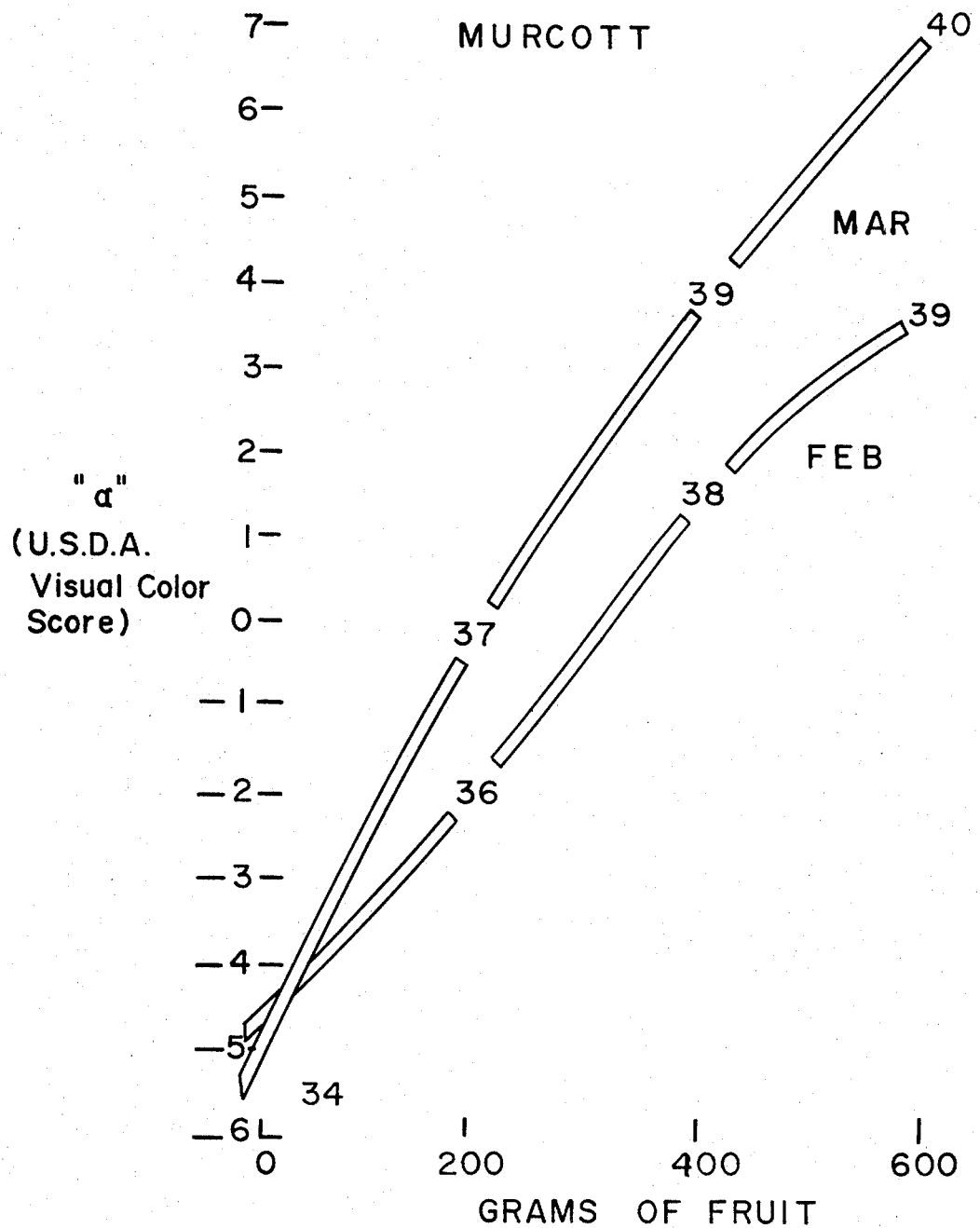

The effect of adding chromoplasts from "Murcott" oranges to a juice of poor color is shown in FIG. 2. As can be seen, chromoplasts isolated from the ripe "Murcott" oranges were very effective in improving the color score of the poor color juice. Chromoplasts from the juice of only 400 grams of equivalent whole fruit were required to raise the color score of 24 ounces of reconstituted concentrate from 34 to 39.

As shown in Tables 1 and 2, a substantial decrease in the color meter $R_d$ value, which is consistent with results observed in commercial juices, was also found when chromoplasts were added to the reconstituted juice.

TABLE 1.—EFFECT ON COLOR OF ORANGE JUICE WITH ADDED "DANCY" TANGERINE CHROMOPLASTS

| Amount color added | Color meter values [1] | | | Visual color score |
|---|---|---|---|---|
| | $R_d$ | a | b | |
| Control | 36.1 | −5.4 | 36.8 | 34 |
| 200 [2] | 35.2 | −1.9 | 36.6 | 36 |
| 400 [2] | 34.2 | 1.0 | 36.5 | 37 |
| 600 [2] | 32.7 | 3.5 | 35.9 | 39 |

[1] Values obtained using 0.6 cm. viewing depth with Carrara plate.
[2] Grams of whole fruit needed to obtain chromoplasts to enhance the color of 24 ounces of reconstituted concentrated orange juice.

TABLE 2.—EFFECT ON COLOR OF ORANGE JUICE WITH ADDED "MURCOTT" ORANGE CHROMOPLASTS

| Amount color added | Color meter values [1] | | | Visual color score |
|---|---|---|---|---|
| | $R_d$ | a | b | |
| Control | 34.8 | −5.5 | 38.9 | 34 |
| 200 [2] | 32.5 | −0.1 | 38.9 | 37 |
| 400 [2] | 30.7 | 4.1 | 38.8 | 39 |
| 600 [2] | 29.5 | 7.3 | 38.5 | 40 |

[1] Values obtained using 0.6 cm. viewing depth with Carrara plate.
[2] Grams of whole fruit needed to obtain chromoplasts to enhance the color of 24 ounces of reconstituted concentrated orange juice.

Advantages in the use of isolated chromoplasts are apparent. Since the chromoplasts represent about 10% of the total volume of whole juice, less space is required for storage. The addition of compacted chromoplasts to improve color does not impart a tangerine or "Murcott" flavor, since flavor constituents are decanted with the supernatant fluid. It should also be noted that the chromoplasts isolated from citrus juice are the natural form in which the characteristic pigments of orange juice are found in the fruit.

We claim:
1. A process for the production of naturally occurring coloring material from citrus fruit which comprises the steps of:
   (a) extracting the juice from said fruit;
   (b) filtering said juice to remove entrained solid particles;
   (c) centrifuging said filtered juice and separating as solid matter, colored chromoplast material;
   (d) removing from said colored chromoplast material that portion of the material contributing brown color and recovering the remaining colored chromoplast material.

2. The process of claim 1 wherein said remaining colored chromoplast material is further washed in water, separated from said water and concentrated.

3. Coloring matter obtained by the process of claim 1.

4. A process for increasing the color level of beverages which comprises the steps of:
   (a) extracting the juice from citrus fruit;
   (b) filtering said juice to remove entrained solid particles;
   (c) centrifuging said filtered juice and separating as solid matter, colored chromoplast material;
   (d) removing from said colored chromoplast material that portion of the material contributing brown color and recovering the remaining colored chromoplast material;
   (e) adding said remaining colored chromoplast material to said beverage in an amount sufficient to increase the color level of the beverage.

5. Process of claim 4, wherein said beverage is citrus juice.

6. The process of claim 4, wherein sufficient of said colored chromoplast material is added to increase the color level of the beverage at least 2 points on the color scale.

7. The process of claim 4, wherein sufficient of said colored chromoplast material is added to increase the color level of the beverage at least about 5 points on the color scale.

References Cited

UNITED STATES PATENTS 3,385,711   5/1968   Sperti _____ 99—105
3,404,990   10/1968  Villadsen _____ 99—105 X
3,037,975   6/1962   Cohn _____ 99—105 X S. LEON BASHORE, Primary Examiner F. FREI, Asistant Examiner U.S. Cl. X.R.

99—148 R